(12) United States Patent
Payette et al.

(10) Patent No.: US 10,662,751 B2
(45) Date of Patent: May 26, 2020

(54) DRILLING A WELLBORE

(71) Applicants: Gregory S. Payette, Spring, TX (US);
Dar-Lon Chang, Sugar Land, TX (US);
Darren Pais, Houston, TX (US);
Jeffrey R. Bailey, Houston, TX (US)

(72) Inventors: Gregory S. Payette, Spring, TX (US);
Dar-Lon Chang, Sugar Land, TX (US);
Darren Pais, Houston, TX (US);
Jeffrey R. Bailey, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 435 days.

(21) Appl. No.: 14/797,568

(22) Filed: Jul. 13, 2015

(65) Prior Publication Data
US 2016/0054729 A1 Feb. 25, 2016

Related U.S. Application Data

(60) Provisional application No. 62/040,274, filed on Aug. 21, 2014.

(51) Int. Cl.
*E21B 44/00* (2006.01)
*E21B 49/00* (2006.01)
(Continued)

(52) U.S. Cl.
CPC .............. *E21B 44/00* (2013.01); *E21B 7/00* (2013.01); *E21B 44/04* (2013.01); *E21B 45/00* (2013.01);
(Continued)

(58) Field of Classification Search
CPC ............. E21B 7/00; E21B 44/00; E21B 45/00
See application file for complete search history.

(56) References Cited

U.S. PATENT DOCUMENTS

| 7,857,047 B2 | 12/2010 | Remmert et al. |
| 7,896,105 B2 | 3/2011 | Dupriest |

(Continued)

FOREIGN PATENT DOCUMENTS

| WO | WO 2007/073430 | 6/2007 |
| WO | WO 2013/036357 | 3/2013 |

(Continued)

OTHER PUBLICATIONS

Meng, C. et al., "Maximizing Drilling Performance with Real-Time Surveillance System Based on Parameters Optimization Algorithm," *Advances in Petroleum Exploration and Development* 8(1), pp. 15-24.

(Continued)

*Primary Examiner* — Robert E Fuller
*Assistant Examiner* — Lamia Quaim
(74) *Attorney, Agent, or Firm* — ExxonMobil Upstream Research Company—Law Department

(57) ABSTRACT

Methods and systems for controlling a drilling operation based on an MSE value calculated for a depth increment are disclosed herein. In an exemplary method, drilling parameters characterizing a drilling operation in a subterranean formation are received in a control system. The drilling parameters are used by the control system to calculate a depth-based mechanical specific energy (MSE) based on some amount of energy expended by at least a portion of a drilling assembly while drilling at least one identified depth sub-interval of a depth interval of a subterranean formation. The control system uses the calculated depth-based MSE to control the drilling operation.

28 Claims, 9 Drawing Sheets

(51) Int. Cl.
*E21B 7/00* (2006.01)
*E21B 44/04* (2006.01)
*E21B 45/00* (2006.01)
*G05B 19/416* (2006.01)

(52) U.S. Cl.
CPC .......... *E21B 49/003* (2013.01); *G05B 19/416* (2013.01); *G05B 2219/45129* (2013.01)

(56) References Cited

U.S. PATENT DOCUMENTS

| | | | |
|---|---|---|---|
| 2002/0195276 A1* | 12/2002 | Dubinsky | E21B 44/005 175/40 |
| 2006/0162962 A1* | 7/2006 | Koederitz | E21B 45/00 175/27 |
| 2010/0252325 A1 | 10/2010 | Porche | |
| 2012/0261190 A1 | 10/2012 | Krueger, IV et al. | |
| 2014/0277752 A1* | 9/2014 | Chang | E21B 44/00 700/275 |
| 2015/0275648 A1* | 10/2015 | Wang | E21B 44/00 702/9 |

FOREIGN PATENT DOCUMENTS

| | | |
|---|---|---|
| WO | WO 2013/063338 A1 | 5/2013 |
| WO | WO 2014/062174 | 4/2014 |
| WO | WO-2014062174 A1 * | 4/2014 ............ E21B 10/00 |
| WO | WO 2014/078027 | 5/2014 |

OTHER PUBLICATIONS

Teale, "The Concept of Specific Energy in Rock Drilling," International Journal of Rock Mechanics and Mining Sciences, 1965, pp. 57-73, vol. 2, Pergamon Press, Great Britain.

Pessier, et al., "Quantifying Common Drilling Problems with Mechanical Specific Energy and a Bit-Specific Coefficient of Sliding Friction," SPE 24584, Oct. 1992, 67th Annual Technical Conference and Exhibition of the Society of Petroleum Engineers, Washington, DC.

Waughman, et al., "Real-Time Specific Energy Monitoring Reveals Drilling Inefficiency and Enhances the Understanding of When to Pull Worn PDC Bits," SPE 74520, Feb. 2002, IADC/SPE Drilling Conference, Dallas, TX.

Dupriest, et al., "Maximizing Drill Rates with Real-Time Surveillance of Mechanical Specific Energy," SPE 92194, Feb. 2005, SPE/IADC Drilling Conference, Amsterdam, The Netherlands.

Armenta, "Identifying Inefficient Drilling Conditions Using Drilling-Specific Energy," SPE 116667, Sep. 2008, 2008 SPE Annual Technical Conference and Exhibition, Denver, CO.

Amadi, et al., "Application of Mechanical Specific Energy Techniques in Reducing Drilling Cost in Deepwater Development," SPE 156370, Jun. 2012, SPE Deepwater Drilling and Completions Conference, Galveston, TX.

* cited by examiner

100

500

600A

700A

700B

DRILLING A WELLBORE

CROSS-REFERENCE TO RELATED APPLICATION

This application claims the benefit of U.S. Provisional Patent Application 62/040,274, filed Aug. 21, 2014, entitled "Drilling a Wellbore," the entirety of which is incorporated by reference herein.

FIELD

The present techniques relate generally to systems and methods for controlling drilling operations. More particularly, the present disclosure relates to systems and methods that may be implemented in hydrocarbon-related drilling operations.

BACKGROUND

The production of hydrocarbons, such as oil and gas, has been performed for many years. To produce these hydrocarbons, one or more wells in a field are drilled to a subsurface location which is generally referred to as a subterranean formation or basin. The process of producing hydrocarbons from the subsurface location typically involves various development phases from a concept selection phase to a production phase. One of the development phases involves the drilling operations that form a fluid conduit from the surface to the subsurface location. The drilling operations may involve using different equipment, such as hydraulic systems, drill pipe, drill bits, mud motors, etc., which are utilized to drill to a target depth.

Mechanical specific energy (MSE) or specific energy (SE) is a measure of the energy required for a drilling assembly to drill through an interval of subterranean formation. The standard formula for determining MSE was originally derived by Teale (Teale, R, "The concept of specific energy in rock drilling," Int. J. Rock Mech. Mining Sci., 1965; 2: 57-73) and may be evaluated using surface data only. Generalizations of this formula have been developed and applied over the last several decades in the oil and gas industry and, depending upon the adopted formulation, may be used in conjunction with surface and/or down hole data.

Under efficient drilling conditions, MSE correlates with the compressive rock strength of the subterranean formation. When a dysfunction, or limiter, is present in the drilling system, however, this correlation breaks down and MSE tends to increase beyond the rock's compressive strength. Common forms of drilling dysfunction (or drilling performance limiters) that can lead to such a deviation from efficient drilling conditions include mechanical vibrations (e.g., whirl, stick-slip and bit bounce, among others), bit balling, insufficient hole cleaning and drill string buckling, among others.

A common industry practice for seeking to avoid or minimize drilling performance limiters is to drill by MSE, or in other words to drill using operational set points, e.g., combinations of weight on bit, rotary speed and mud flow rate, that result in a minimum MSE while maintaining a forward rate of penetration (ROP). Drilling by MSE balances the desire for increased ROP with the need to avoid wearing out the bit and tools prematurely due to limiters. For example, U.S. Pat. No. 7,857,047 to Remmert et al. discloses a method of drilling and producing hydrocarbons from subsurface formations. The method includes performing drilling operations at one or more wells to a subsurface location in a field to provide fluid flow paths for hydrocarbons to a production facility. The drilling is performed by obtaining MSE data and other measured data during the drilling operations. The MSE data and other measured data may be used to determine the existence of at least one limiter. Lithology data for the well is obtained and examined. A primary limiter of the at least one limiter is identified based on the lithology data, and drilling operations are adjusted to mitigate at least one of the at least one limiter.

As another example, U.S. Pat. No. 7,896,105 to Dupriest discloses a method of drilling and producing hydrocarbons from subsurface formations. The method includes identifying a field having hydrocarbons. One or more wells are drilled to a subsurface location in the field to provide fluid flow paths for hydrocarbons to a production facility. The drilling is performed by estimating a drill rate for one of the wells, determining a difference between the estimated drill rate and an actual drill rate, and obtaining MSE data and other measured data during the drilling of the one of the wells. The MSE data and other measured data are used to determine one of a plurality of limiters that limit the drill rate. Drilling operations are adjusted to mitigate one of the plurality of limiters. The process is iteratively repeated until the subsurface formation has been reached by the drilling operations.

Although MSE is useful as a diagnostic tool for identifying and mitigating dysfunction and limiters, it is often prone to large fluctuations induced by transients and noise associated with the drilling process. By definition, MSE is an instantaneous quantity that requires an instantaneous knowledge of weight on bit (WOB), surface (or possibly down hole) torque (TQ) and depth of cut (DOC), wherein DOC is a function of the drill string rotary speed (RPM) and a rate of penetration (ROP). Quantities such as TQ, RPM and (to a slightly lesser extent) WOB can be reliably evaluated almost instantaneously using surface data.

SUMMARY

Methods and systems for controlling a drilling operation using an MSE value calculated for a depth increment are disclosed herein. In an exemplary method, drilling parameters characterizing a drilling operation in a subterranean formation are received in a control system. The drilling parameters are used by the control system to calculate a depth-based MSE based on some amount of energy expended by at least a portion of a drilling assembly while drilling at least one identified depth sub-interval of a depth interval of a subterranean formation. The drilling operation is controlled by the control system based, at least in part, on the calculated depth-based MSE. A wellbore is drilled during the drilling operation.

Another embodiment provides a system for controlling a drilling operation. The system includes a processor, a number of sensors, and a storage medium. The storage medium includes computer readable instructions configured to direct the processor to obtain a number of drilling parameters from the sensors to characterize a drilling operation. The drilling parameters and an energy conserving method are used to calculate a depth-based MSE based on some amount of energy expended by at least a portion of a drilling assembly while drilling at least one identified depth sub-interval of a depth interval of a subterranean formation. The depth-based MSE is used to recommend adjustments to the drilling parameters.

Another embodiment provides a non-transitory machine readable medium that includes instructions configured to direct a processor to receive data regarding a number of drilling parameters characterizing a drilling operation in a control system. The control system calculates a depth-based MSE based on some amount of energy expended by at least a portion of a drilling assembly while drilling at least one identified depth sub-interval of a depth interval of a subterranean formation. The non-transitory machine readable medium includes instructions configured to direct the processor to adjust drilling parameters during the drilling process.

Another embodiment provides a drilling advisory system that includes a processor, a data collection system coupled to a drilling apparatus, and a storage medium. The storage medium includes code configured to direct the processor to obtain drilling parameters characterizing a drilling operation in a subterranean formation from the data collection system and to use the drilling parameters to calculate a depth-based MSE based on some amount of energy expended by at least a portion of a drilling assembly while drilling at least one identified depth sub-interval of a depth interval of a subterranean formation. The storage medium also includes code to determine a subset of depth sub-intervals from a set of identified depth sub-intervals, and use the depth-based MSE values for each element in the subset of depth sub-intervals to recommend adjustments to the drilling parameters.

DESCRIPTION OF THE DRAWINGS

The advantages of the present techniques are better understood by referring to the following detailed description and the attached drawings, in which.

Figure 1:
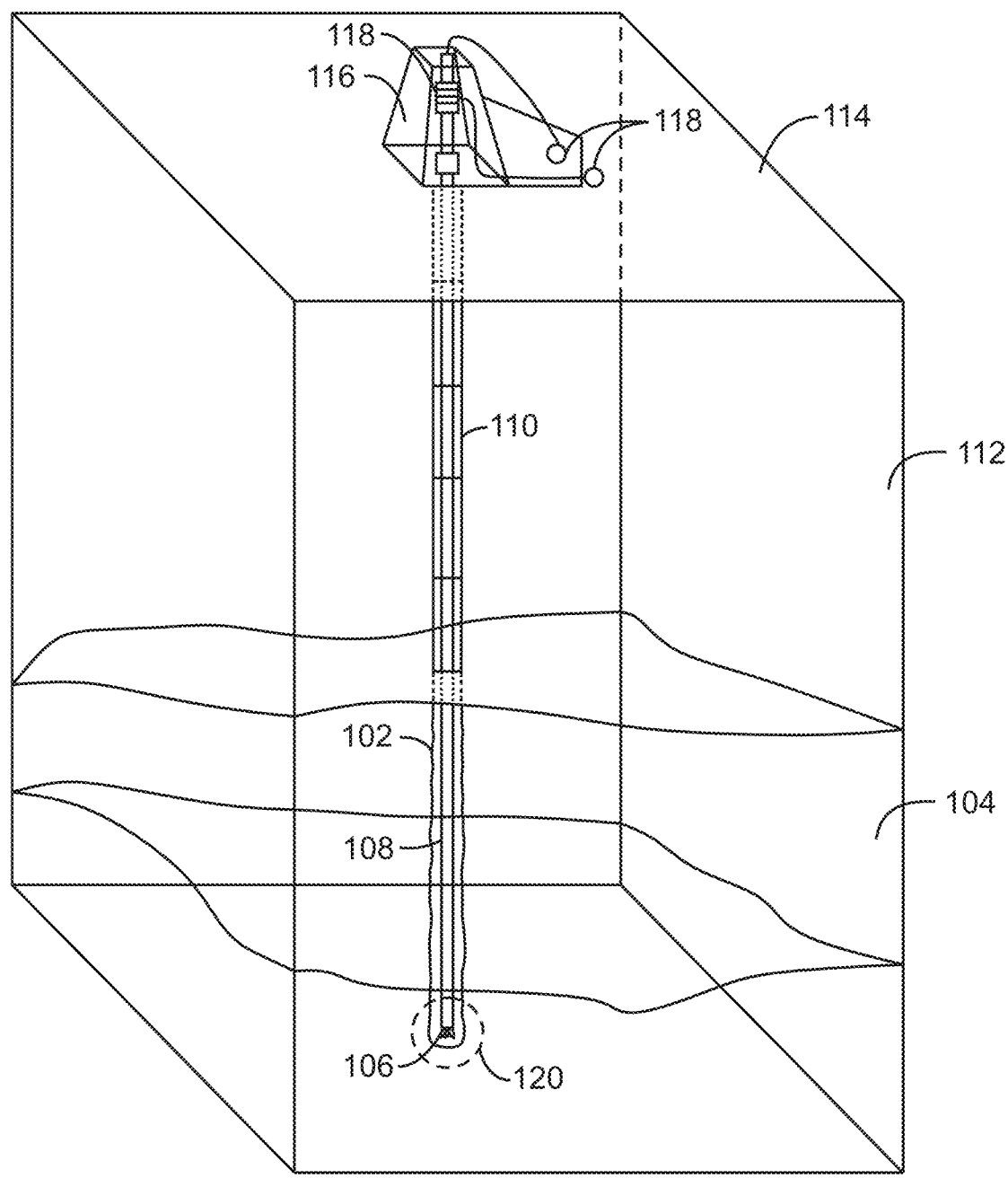
FIG. 1 is a drawing of a drilling operation for forming a wellbore to a subterranean formation.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements.

DETAILED DESCRIPTION

In the following detailed description section, the specific embodiments of the present techniques are described in connection with exemplary embodiments. However, to the extent that the following description is specific to a particular embodiment or a particular use of the present techniques, this is intended to be for exemplary purposes only and simply provides a description of the exemplary embodiments. Accordingly, the present techniques are not limited to the specific embodiments described below, but rather, such techniques include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

A "facility" is a tangible piece of physical equipment, or group of equipment units, through which hydrocarbon fluids are either produced from a reservoir or injected into a reservoir. In its broadest sense, the term facility is applied to any equipment that may be present along the flow path between a reservoir and its delivery outlets. Facilities may comprise production wells, injection wells, well tubulars, wellhead equipment, gathering lines, manifolds, pumps, compressors, separators, surface flow lines, and delivery outlets. In some instances, the term "surface facility" is used to distinguish those facilities other than wells.

"Formation" refers to a body or section of geologic strata, structure, formation, or other subsurface solids or collected material that is sufficiently distinctive and continuous with respect to other geologic strata or other characteristics that it can be mapped, for example, by seismic techniques. A formation can be a body of geologic strata of predominantly one type of rock or a combination of types of rock, or a fraction of strata having a substantially common set of characteristics. A formation can contain one or more hydrocarbon-bearing subterranean formations. Note that the terms formation, hydrocarbon-bearing subterranean formation, reservoir, and interval may be used interchangeably, but may generally be used to denote progressively smaller subsurface regions, zones, or volumes. More specifically, a geologic formation may generally be the largest subsurface region; a hydrocarbon reservoir or subterranean formation may generally be a region within the geologic formation and may generally be a hydrocarbon-bearing zone, a formation, reservoir, or interval having oil, gas, heavy oil, and any combination thereof. An interval or production interval may generally refer to a sub-region or portion of a reservoir. A hydrocarbon-bearing zone, or production formation, may be separated from other hydrocarbon-bearing zones by zones of lower permeability such as mudstones, shales, or shale-like (highly compacted) sands. In one or more embodiments, a hydrocarbon-bearing zone may include heavy oil in addition to sand, clay, or other porous solids.

"Hydrocarbon production" refers to any activity associated with extracting hydrocarbons from a well or other opening. Hydrocarbon production normally refers to any activity conducted in or on the well after the well is completed. Accordingly, hydrocarbon production or extraction includes not only primary hydrocarbon extraction but also secondary and tertiary production techniques, such as injection of gas or liquid for increasing drive pressure, mobilizing the hydrocarbon or treating by, for example, chemicals or hydraulic fracturing the wellbore to promote increased flow, well servicing, well logging, and other well and wellbore treatments.

"Hydrocarbons" are generally defined as molecules formed primarily of carbon and hydrogen atoms such as oil and natural gas. Hydrocarbons may also include other elements, such as, but not limited to, halogens, metallic elements, nitrogen, oxygen, and/or sulfur. Hydrocarbons may be produced from hydrocarbon-bearing subterranean formations through wells penetrating a hydrocarbon containing formation. Hydrocarbons derived from a hydrocarbon-bearing subterranean formation may include, but are not limited to, kerogen, bitumen, pyrobitumen, asphaltenes, oils, natural gas, or combinations thereof. Hydrocarbons may be located within or adjacent to mineral matrices within the earth. Matrices may include, but are not limited to, sedimentary rock, sands, silicilytes, carbonates, diatomites, and other porous media.

"Limiters" refers to various conditions that develop during a drilling operation that decrease the transfer of energy from a drill bit to the rock. The limiters may prevent the bit from achieving a desired ROP through a rock formation, slowing or stopping the drilling process. Limiters may include bit balling, bottom hole balling, bit dulling, and the like. Bit balling is caused by the accumulation of rock debris in the teeth of a drill bit, for example, in rock types that are prone to agglomeration. Over time, the accumulated debris may limit a portion of the WOB applied to the cutting structure from reaching the rock. Bottom hole balling is an accumulation of fine rock debris at the bottom of the wellbore, which interferes with the transfer of energy from the bit to the rock. Bit dulling is a wearing of the cutting surfaces of the bit that results in a less efficient cutting of material from the rock face. Various other conditions can be limiters, such as vibrations including whirling vibrations, slip-stick vibrations, axial vibrations, and the like.

"Natural gas" refers to various compositions of raw or treated hydrocarbon gases. Raw natural gas is primarily comprised of light hydrocarbons, such as methane, ethane, propane, butanes, pentanes, hexanes, and impurities like benzene, but may also contain small amounts of non-hydrocarbon impurities, such as nitrogen, hydrogen sulfide, carbon dioxide, and traces of helium, carbonyl sulfide, various mercaptans, or water. Treated natural gas is primarily comprised of methane and ethane, but may also contain small percentages of heavier hydrocarbons, such as propane, butanes, and pentanes, as well as small percentages of nitrogen and carbon dioxide.

"Overburden" refers to the subsurface formation overlying the formation containing one or more hydrocarbon-bearing zones (the reservoirs). For example, overburden may include rock, shale, mudstone, or wet/tight carbonate (such as an impermeable carbonate without hydrocarbons). An overburden may include a hydrocarbon-containing layer that is relatively impermeable. In some cases, the overburden may be permeable.

"Pressure" refers to a force acting on a unit area. Pressure is usually provided in units of pounds per square inch (psi). "Atmospheric pressure" refers to the local pressure of the air. Local atmospheric pressure is assumed to be 14.7 psia, the standard atmospheric pressure at sea level. "Absolute pressure" (psia) refers to the sum of the atmospheric pressure plus the gauge pressure (psig). "Gauge pressure" (psig) refers to the pressure measured by a gauge, which indicates only the pressure exceeding the local atmospheric pressure (a gauge pressure of 0 psig corresponds to an absolute pressure of 14.7 psia).

As previously mentioned, a "reservoir" or "hydrocarbon reservoir" is defined as a pay zone or production interval (for example, a hydrocarbon-bearing subterranean formation) that includes sandstone, limestone, chalk, coal, and some types of shale. Pay zones can vary in thickness from less than one foot (0.3048 m) to hundreds of feet (hundreds of m). The permeability of the reservoir formation provides the potential for production.

"Substantial," when used in reference to a quantity or amount of a material, or a specific characteristic thereof, refers to an amount that is sufficient to provide an effect that the material or characteristic was intended to provide. The exact degree of deviation allowable may in some cases depend on the specific context.

An "index" is a bounded natural number, i.e., an integer k with the property that $0<k<\infty$. An example of an index is $k=146$.

An "interval" is a set of real numbers with the property that any number that lies between any two numbers in the set is also included in the set. An example of an interval is $I=[13.68, 22]$.

A "depth interval" is an interval of subterranean formation that has been drilled by a drilling assembly, typically measured along the central axis of the wellbore. The values in the depth interval correspond with measured depths (as opposed to vertical depths). A depth interval may be defined for a single subterranean formation, a subset of a single subterranean formation, multiple subterranean formations, or subsets of multiple subterranean formations. An example of a depth interval is $I=[11,458 \text{ ft}, 12,988 \text{ ft}]$.

A "depth increment" is a positive scalar quantity denoted by $\Delta s_k$ (for some index k) prescribed for a measured bit depth $s_k$ (also indexed by k). An example of a depth increment is $\Delta s_{794}=2.65$ ft, where $k=794$.

A "depth sub-interval" is an interval of rock drilled by a drilling assembly denoted by $I_k$, for some index k, where k is also an index for a measured bit depth $s_k$ and a depth increment $\Delta s_k$. A depth sub-interval is defined for a given index k as $I_k=[s_k-\Delta s_k, s_k]$ and as such is determined by the measured bit depth $s_k$ and the depth increment $\Delta s_k$. In the context of this document, a depth interval is comprised of one or more depth sub-intervals, and each sub-interval has an associated depth increment. An example of a depth sub-interval is $I_{32,465}=[12,045.7 \text{ ft}, 12,046.7 \text{ ft}]$, where $s_{32,465}=12,046.7$ ft, $\Delta s_{32,465}=1$ ft, and $k=32,465$.

Overview

Techniques described herein provide methods and systems for evaluating a depth-based MSE that compensates for noise in the received drilling data while providing a robust estimate of the energy expended while drilling. The techniques include a filter for producing a temporally evolving depth-based MSE signal while drilling through an arbitrary depth interval of subterranean formation. At a given instance in time the filter may be invoked to produce a depth-based MSE value by averaging, over a depth sub-interval of subterranean formation that has been drilled, a selected MSE formula, where the averaging is performed using the received drilling data. The depth sub-interval is fully determined by the measured bit depth at the given instance in time and a prescribed depth increment.

The averaging of the selected MSE formula is performed using an energy-conserving method. The method is "energy-conserving" in the sense that the averaging consistently accounts for the energy expended and therefore ensures that the resulting depth-based MSE value represents the actual energy expended by some portion of the drilling assembly while drilling the depth sub-interval, divided by the volume of rock drilled for the depth sub-interval. The filter may be used to produce the depth-based temporally evolving MSE signal while drilling. Any MSE value produced by the signal will therefore correspond with a finite amount of energy expended by the drilling assembly, divided by a finite volume of subterranean formation drilled.

At any given time, the depth-based MSE value will be associated with a sub-interval of subterranean formation drilled, defined by the measured bit depth at the given time and the depth increment. This evaluation of depth-based MSE is in contrast to a direct evaluation of MSE using the selected MSE formula itself which, by definition, produces an instantaneous MSE value at a measured bit depth using instantaneous drilling data. Such values are problematic as the rate of penetration of the drilling assembly cannot always be established reliably on an instantaneous basis. There are also issues with determining instantaneous values of other parameters in the MSE formula. Furthermore, a temporally evolving MSE signal produced by directly evaluating the selected MSE formula may result in a signal with an onerously low signal-to-noise ratio.

The energy-conserving method may also be used to generate formulas for evaluating depth-based averages of each of the quantities (e.g., torque, weight on bit, drill string rotary speed, among others) appearing in the selected MSE formula, and filters may be developed based on these formulas. Each filter, including the depth-based MSE filter, may be implemented such that the value prescribed for the depth increment is constant for a given drilling operation or is time varying due to a variety of factors including, but not limited to, changes in drilling conditions.

The techniques described herein may be used to make recommendations for controlling drilling operating parameters from surface or down hole data using a drilling advisory system. The drilling advisory system may use the depth-based MSE to identify limiters that can slow or stop drilling operations, such as a bit balling event, a bit dulling event, a bit wear event, or a change in rock type, among others. The identification of the limiters may be used to modify the drilling operation, for example, by backing off the WOB and/or increasing RPM to mitigate a bit balling event, among others. Further, the calculation of the depth-based MSE may allow for controlling the drilling operation to keep the depth-based MSE within a target range, for the purpose of reducing wear on the bit and other equipment. The drilling advisory system may also use the depth-based MSE to infer the existence of limiters rather than identify any one particular limiter by monitoring the behavior of the depth-based MSE signal as drilling parameters are varied during the course of the drilling operation. For example, lateral vibrations of the drilling assembly are often identified by an increased MSE value for certain operating parameters. Without specific determination of the lateral vibration limiter, observation of lower depth-based MSE values at different operating conditions can guide the driller to choose parameters that generate lower vibrations.

FIG. 1 is a drawing of a drilling operation 100 for forming a wellbore 102 to a subterranean formation 104. The drilling operation 100 is conducted by a drill bit 106 that is attached to a drillstring 108. The drill bit 106 can be unpowered, using rotation of the drillstring 108 at the surface to power the drilling process 100. In some embodiments, the drill bit 106 can include a mud motor that is powered by fluid flow through the drillstring 108. Casing segments 110 are generally installed along the wellbore 102 after drilling, for example, through the overburden 112.

At the surface 114, a drilling rig 116 is used to suspend the drillstring 108 and drill bit 106. Equipment 118 on the drilling rig 116 is used to rotate the drillstring 108, pump fluids through the drillstring 108, and measure drilling parameters, such as the WOB, RPM, pressures, torques, bit position, and the like. This is discussed further with respect to FIG. 3. Various drilling dysfunctions, or limiters, can arise during the drilling procedures that affect the efficiency of the drilling operation 100. For example, binding of the bit or drillstring 108 along the wellbore 102 in either the casing segments 110 or in the openhole wellbore 102 may lead to stick-slip behavior. Further, the drill bit 106 can develop some plugging, or bit balling, from agglomeration of tailings, especially in the presence of aqueous drilling fluids. These conditions can be determined directly or the consequences of the existence of these conditions on drilling efficiency may be determined by calculating the depth-based MSE for the drilling operation. Further, the drilling operations may be controlled by calculating the depth-based MSE and adjusting the drilling parameters to avoid limiters.

Figure 2:
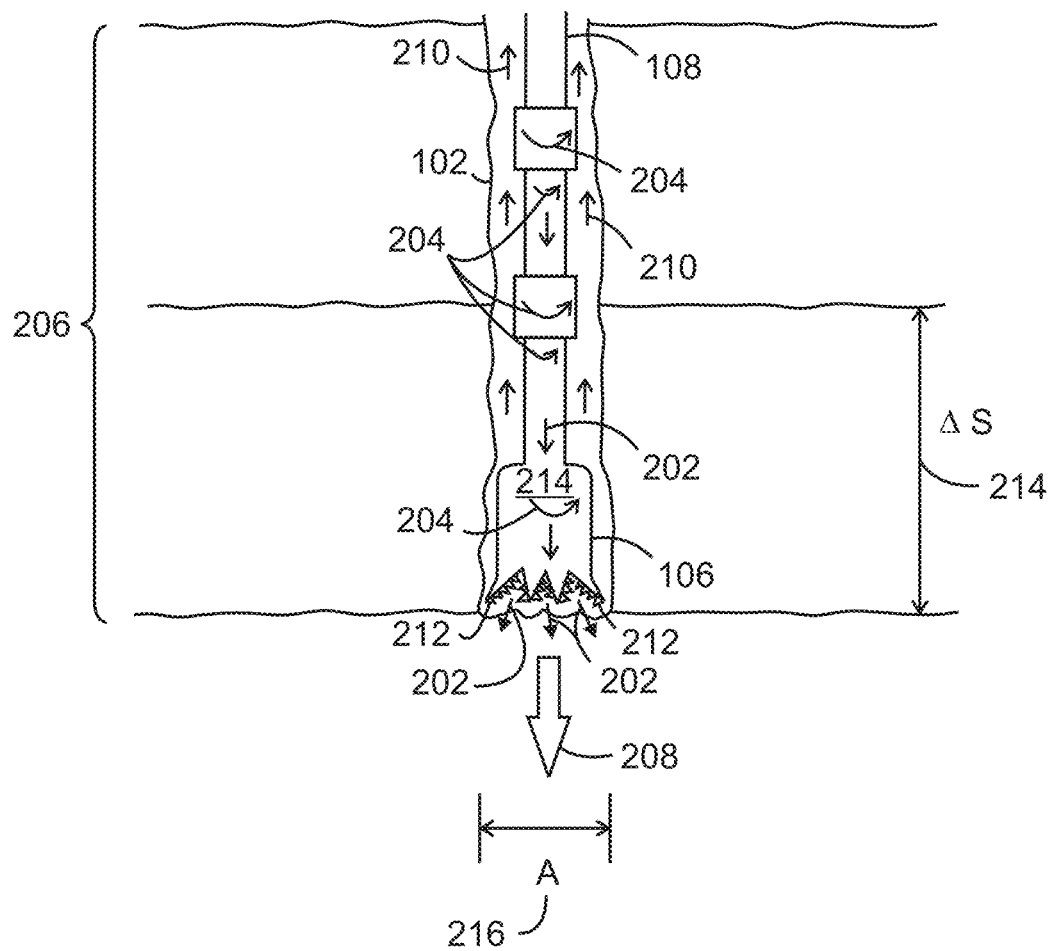
FIG. 2 is a close up view of a drilling operation, illustrating a unit length that moves with the drill bit during the drilling operation and defines a unit volume.

FIG. 2 is a close up view of a drilling operation 100, illustrating a unit length that moves with the drill bit during the drilling operation and defines a unit volume. Like numbered items are as discussed with respect to FIG. 1. During this operation, fresh drilling mud 202 is flowed through the drillstring 108 to the drill bit 106 and out through nozzles in the drill bit 106. As the drillstring 108 is rotated, as indicated by an arrow 204, the drill bit 106 abrades the subsurface layers 206, allowing the drill bit 106 to proceed forward into the subsurface layers 206, as indicated by an arrow 208. The tailings from the drilling operation 100 are swept from the drill bit 106 by the fresh drilling mud 202 and carried back up the wellbore 102 as a tailings slurry 210.

However, different subsurface layers 206 and conditions may affect the drilling operations. For example, some subsurface layers 206, such as clays and shales, may be susceptible to agglomeration after abrasion, which can plug the drill bit 106 by sticking in the teeth 212 or in slots in the body 214. This condition is termed bit balling. The bit balling may slow, or even stop, the forward advance of the drill bit 106. Other limiters, such as whirling of the drillstring, can cause similar difficulties.

If detected in time, these problems can be avoided or reversed. For example, bit balling can often be reversed, for example, by lifting the drill bit 106 from the bottom of the borehole 102 and washing the drill bit 106 with the flow of the drilling mud 202. However, if the limiters are not detected in time, they may cause permanent damage to the drill string 108, the drill bit 106, or the borehole 212. For example, bit balling may form a permanent plug that cannot be reversed without tripping out of hole. Accordingly, the early detection of limiters can substantially lower costs associated with drilling wells.

The use of MSE to control drilling may allow the detection and mitigation of these types of events before they become problematic, for example, by allowing adjustment of the energy applied per unit volume of rock drilled to effectively advance the drill bit. MSE may be calculated as a signal based on instantaneous drilling data for use in controlling the drilling operations. However, this may result in a signal with a low signal-to-noise ratio, thereby compromising the usefulness of the resulting MSE signal in identifying, inferring, or mitigating drilling performance limiters. While time-based averaging techniques may be adopted to produce smoother averaged MSE signals, such techniques do not guarantee the preservation of vital information regarding the energy expended while drilling (i.e., the techniques will not generally be "energy-conserving"), nor do they result in calculations based on prescribed depth increments. The latter is important, as it is the depth increment which often governs the signal-to-noise ratio of a calculated averaged MSE value.

The techniques described herein may be used to evaluate a depth-based MSE based on a selected MSE equation in a manner that accounts for the total amount of energy expended by some portion of the drilling assembly during the course of drilling a depth sub-interval of subterranean formation associated with a measured bit depth and a prescribed value for a depth increment 214. The drill bit area A 216, which is constant, and the depth increment 214 are used to determine the volume for the depth-based MSE calculation. The depth increment 214 may be prescribed before the drilling operations, based on the configuration of the drilling apparatus and the expected subsurface layers 206. In an embodiment, the depth increment 214 may be prescribed during the drilling operations, for example, based on the depth-based MSE calculations during drilling. In some instances, the depth increment may be varied during the operations.

Figure 3:
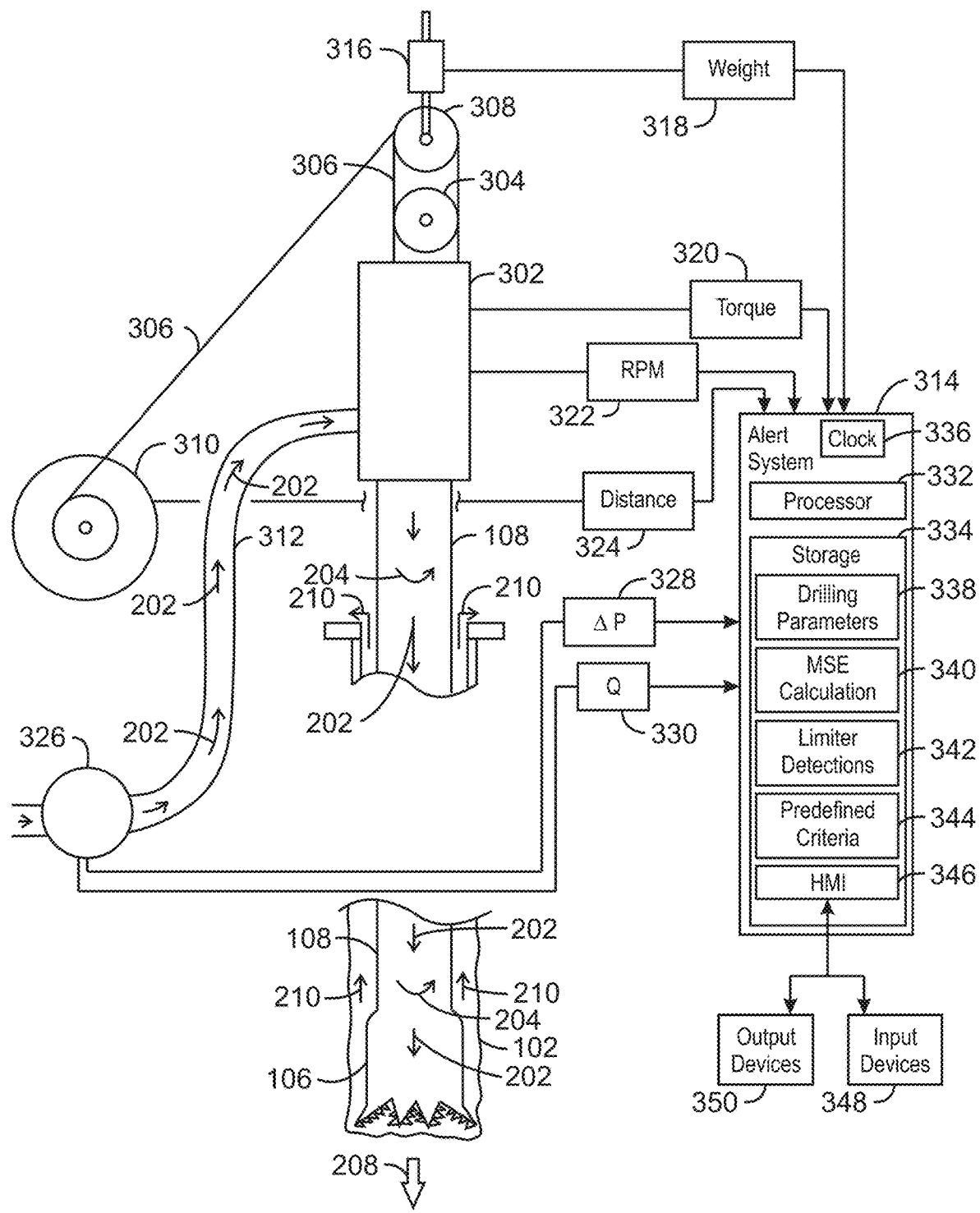
FIG. 3 is a schematic of a drilling rig that is equipped for controlling a drilling operation using mechanical specific energy (MSE)

FIG. 3 is a schematic of a drilling rig 300 that is equipped for controlling a drilling operation using depth-based MSE. Like numbered items are as described with respect to FIGS. 1 and 2. It can be understood that not all of the parts of the drilling rig 300 are shown, nor are the parts shown in the precise positions they would be on the drilling rig 300. Further, different parts may be used in place of some of the parts shown. For example, as shown in FIG. 3, the drill string 108 is rotated by a top drive 302, but a Kelly drive and rotary table may be used instead of or in addition to the top drive 302. The top drive 302 is suspended from a travelling block 304 by a drill line 306. A crown block 308 is used with the travelling block 304 to raise and lower the top drive 302 and the attached drill string 108. The drill line 306 is reeled in or out from a draw-works 310, powered by a motor (not shown). Drilling mud 202, or other drilling fluid, is pumped to the top drive 302 through a Kelly hose 312.

Any number of sensors may be used on the drilling rig 300 to determine various drilling parameters during a drilling operation. The drilling parameters can then be provided to a computing system 314 that uses the parameters to implement the techniques described herein. These sensors can include a strain gauge 316 that is incorporated into the support of the crown block 308. The strain gauge 316 can provide a measurement to a processing unit that can determine weight 318, which can be used to determine the WOB. Alternatively, the tension in the deadline can be measured. The top drive 302, or a rotary table, can incorporate sensors that provide information used by processing units to determine torque 320 and rotational speed (RPM) 322. The draw-works 310 can incorporate sensors that measure the amount of drill line 306 that has been played out or reeled in, which can be used by a processing unit to determine the distance 324 to the drill bit 106, which can be used to provide the measurement of the distance to the bottom of the borehole 102 and the rate of penetration (ROP), among others. Sensors 326 incorporated into the flow of the drilling mud 202, for example, before the Kelly hose 312, can provide data to processing units to determine the difference in pressure ($\Delta P$) 328 between the drilling mud 202 provided to the drillstring 108 and the pressure in the wellbore 102 outside the drillstring 108. Further, the sensor 326 on the drilling mud 202 can provide the flow rate (Q) 330 of the drilling mud 202 provided to the drillstring 108.

Figure 4:
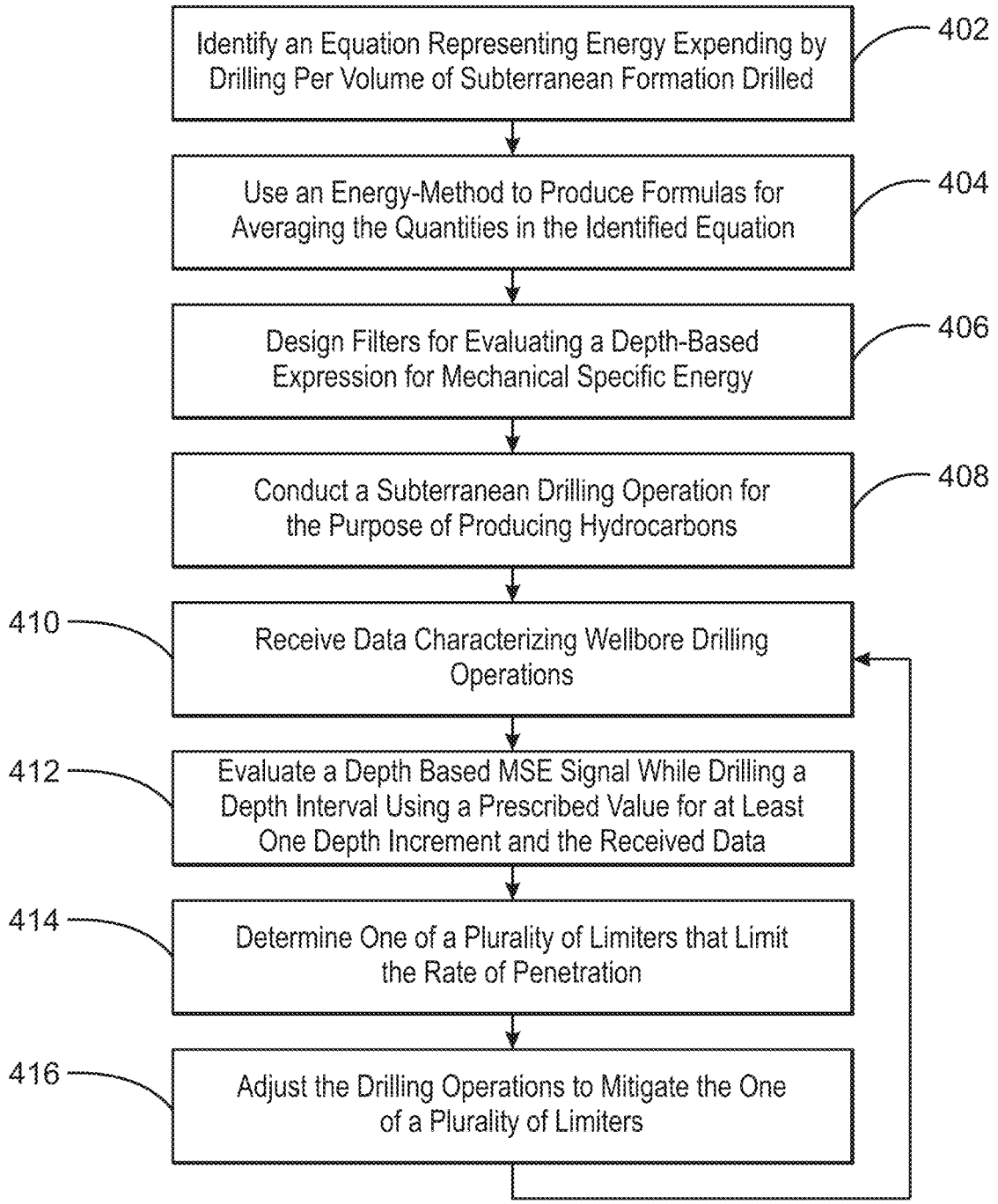
FIG. 4 is a process flow diagram of a method for controlling a drilling operation using MSE.

The computing system 314 implements the method described herein, for example, with respect to FIG. 4. The computing system 314 may be a standalone computer, a part of a distributed control system (DCS), a programmable logic controller (PLC), or any number of other systems. The computer system 314 includes a processor 332 configured to execute machine readable instructions provided in a storage system 334. The processor 332 can be a single core processor, a multi-core processor, a virtual processor in a cloud computing system, an application specific integrated circuit (ASIC), or any number of other units. A clock 336 function can be used by the processor to collect time stamped data sets, which can be used to collect sequential measurements to determine depth-based MSE over time.

The storage system 334 can include random access memory (RAM), read only memory (ROM), hard drives, optical drives, RAM drives, virtual drives in a cloud computing configuration, or any number of other storage systems. The storage system 334 can hold the code and data blocks used to implement the methods, including a code for obtaining and storing drilling parameters 338. The drilling parameters 338 can be used by code blocks that perform a depth-based MSE 340 calculation, for example, over various depth sub-intervals. Similarly, diagnostic plots of depth-based MSE may be generated to use in drilling operations. Although the diagnostic plots of the depth-based MSE may be displayed for operators and drilling engineers, the correlations are generally used within the computing system 314, for example, to recommend adjustments to the drilling parameters. Further, a limiter detection block 342 can use the depth-based MSE to identify limiters that may be interfering with drilling operations. For example, the limiter detection block 342 can compare the depth-based MSE to a database of predefined criteria 344 that indicate the presence of limiters.

The results can be provided to a user, such as an operator or drilling engineer, through a human machine interface (HMI) 346. The HMI 346 provides an interface between the computing system 314 and various input devices 348 and output devices 350. The input devices 348 can include keyboards and pointing devices used to provide input and configuration data to the computing system 314. The output devices 350 can include a display, an audible tone generator, an electronic mail interface, or a phone interface, or any combinations thereof. Accordingly, warnings can be communicated to a user as a screen change, a tone, a pager signal, a text message, an e-mail, or as any other types of communications.

FIG. 4 is a process flow diagram of a method 400 for controlling a drilling operation using depth-based MSE. The method begins at block 402 with the identification of an equation representing specific energy expended by some portion of the drilling assembly when drilling a subterranean formation (where specific energy constitutes an instantaneous measure of energy expended per instantaneous volume of subterranean formation drilled).

There are various specific energy or MSE equations which have been presented in the literature, including the original formula for MSE derived by Teale, along with modifications of this equation to account for additional effects (e.g., mud motors, hydraulics, and down hole sensors, among others). The general formula for instantaneous MSE [ksi] (as presented by Teale) may be expressed as shown in Eqn. 1.

$$MSE = \frac{1}{A}\left(WOB + 24\pi \frac{TQ}{DOC}\right) \qquad (1)$$

In Eqn. 1, A is the cross-sectional area of the hole (in²), WOB is the weight on bit (klb_f), TQ is the applied torque (klb_f×ft), and DOC is the depth of cut (in/Rev.). The depth of cut is related to the rate of penetration ROP [ft/hr] and rotary speed RPM [Rev./min] by the formula shown in Eqn. 2.

$$DOC = \frac{ROP}{5RPM} \quad (2)$$

The method includes the implementation of an energy-conserving procedure for averaging MSE as well as other variables appearing in the MSE formula (in this case WOB, TQ, DOC, ROP, and RPM) over an interval of elapsed drilling time corresponding with a depth sub-interval of subterranean formation drilled. The method relies on data received while drilling and a prescribed value for a depth increment. The method may be used to determine depth-based average parameter values for each of the quantities appearing in the MSE formula in a manner that naturally filters transients and noise such that an acceptable signal-to-noise ratio is achieved for each of the averaged parameters throughout the drilling process. Moreover, the method ensures that the resulting formulas are "energy-conserving" in the sense that any averaged MSE value is equal to the energy expended by at least a portion of the drilling apparatus while drilling a depth sub-interval, divided by the volume of rock drilled for the depth sub-interval.

At block 404, an energy-conserving method is used to produce formulas for averaging the quantities in the identified specific energy equation. This can be facilitated by introducing an index k that may be used to index data that is received or calculated while drilling. Quantities indexed by k are typically understood (but not required) to correspond with a particular instance of drilling time. Received quantities which may be indexed by k are time $t_k$, measured bit depth $s_k$, weight on bit $WOB_k$, surface torque $TQ_k$ and drill string rotary speed $RPM_k$, among others. The central axis of the wellbore can be parameterized at the time $t_k$ using the curvilinear coordinate s such that $s \in [0, s_k]$, where s is taken to be zero at the rig floor (or some other suitable location). For a given index k, the total measured depth interval is given as $[0, s_k]$. A number of additional depth intervals can also be identified as subsets of the depth interval $[0, s_k]$. For each k a depth increment $\Delta s_k$ is prescribed. The prescribed depth increment $\Delta s_k$ can be further used to define a depth sub-interval $I_k$ as shown in Eqn. 3.

$$I_k = [s_k - \Delta s_k, s_k] \quad (3)$$

The depth increment is prescribed such that $\Delta s_k > 0$ for each index k. It is further understood that $s_k \geq s_{k-1}$ for each k. For any given depth sub-interval $I_k$ a depth-based MSE is defined as shown in Eqn. 4.

$$\overline{MSE}_k = \frac{\int_{s_k - \Delta s_k}^{s_k} MSE \, ds}{\Delta s_k} = \frac{1}{\Delta s_k A} \int_{s_k - \Delta s_k}^{s_k} \left(WOB + 24\pi \frac{TQ}{DOC}\right) ds \quad (4)$$

Expressing the curvilinear coordinate s as a function of time t, i.e., by taking $s = s(t)$, $\overline{MSE}_k$ can be written as shown in Eqn. 5.

$$\overline{MSE}_k = \frac{1}{\Delta s_k A} \int_{t_k - \Delta t_k}^{t_k} \left(WOB + 24\pi \frac{TQ}{DOC}\right) ROP \, dt \quad (5)$$

In Eqn. 5, $t_k$ is the time associated with $s_k$, and likewise $\Delta t_k$ is the time increment associated with $\Delta s_k$ (i.e., $\Delta t_k$ is the elapsed drilling time between measured bit depths $s_k - \Delta s_k$ and $s_k$). As a direct result, $s_k = s(t_k)$ and $s_k - \Delta s_k = s(t_k - \Delta t_k)$. $\overline{MSE}_k$ may be expressed equivalently as shown in Eqn. 6.

$$\overline{MSE}_k = \frac{\int_{t_k - \Delta t_k}^{t_k} MSE \cdot ROP \, dt}{\int_{t_k - \Delta t_k}^{t_k} ROP \, dt} \quad (6)$$

Due to the form of the above expression, it is useful to introduce the notation shown in Eqn. 7.

$$\overline{(\cdot)}_k = \frac{\int_{t_k - \Delta t_k}^{t_k} (\cdot) ROP \, dt}{\int_{t_k - \Delta t_k}^{t_k} ROP \, dt} \quad (7)$$

In Eqn. 7, $\overline{(\cdot)}_k$ represents an ROP-weighted average over the time sub-interval: $\tau_k = [t_k - \Delta t_k, t_k]$. Using this formula, $\overline{MSE}_k$ can be expressed in any of the equivalent ways shown in Eqns. 8-13.

$$\overline{MSE}_k = \frac{1}{A}\left[\overline{WOB}_k + 24\pi \overline{\left(\frac{TQ}{DOC}\right)}_k\right] \quad (8)$$

$$\overline{MSE}_k = \frac{1}{A}\left[\overline{WOB}_k + 24\pi \overline{\left(\frac{TQ(5RPM)}{ROP}\right)}_k\right] \quad (9)$$

$$\overline{MSE}_k = \frac{1}{A}\left(\overline{WOB}_k + 120\pi \frac{\int_{t_k - \Delta t_k}^{t_k} \frac{TQ \cdot RPM}{ROP} ROP \, dt}{\int_{t_k - \Delta t_k}^{t_k} ROP \, dt}\right) \quad (10)$$

$$\overline{MSE}_k = \frac{1}{A}\left[\overline{WOB}_k + 120\pi \frac{\left(\frac{\int_{t_k - \Delta t_k}^{t_k} TQ \cdot RPM \, dt}{\int_{t_k - \Delta t_k}^{t_k} RPM \, dt}\right)\left(\frac{\int_{t_k - \Delta t_k}^{t_k} RPM \, dt}{\Delta t_k}\right)}{\left(\frac{\int_{t_k - \Delta t_k}^{t_k} ROP \, dt}{\Delta t_k}\right)}\right] \quad (11)$$

$$\overline{MSE}_k = \frac{1}{A}\left(\overline{WOB}_k + 24\pi \frac{\langle TQ \rangle_k}{\langle DOC \rangle_k}\right) \quad (12)$$

$$\overline{MSE}_k = \frac{1}{A}\left(\overline{WOB}_k + 120\pi \frac{\langle TQ \rangle_k \times \widehat{RPM}_k}{\widehat{ROP}_k}\right) \quad (13)$$

In Eqns. 8-13, the time-averaging operators shown in Eqn. 14 have been introduced.

$$\langle \cdot \rangle_k = \frac{\int_{t_k - \Delta t_k}^{t_k} (\cdot) RPM \, dt}{\int_{t_k - \Delta t_k}^{t_k} RPM \, dt}, \quad \widehat{(\cdot)}_k = \frac{\int_{t_k - \Delta t_k}^{t_k} (\cdot) \, dt}{\Delta t_k} \quad (14)$$

Further, the expressions on the right side of the formula for $\overline{MSE}_k$ can be expressed as shown in Eqns. 15-19.

$$\overline{WOB}_k = \frac{\int_{t_k-\Delta t_k}^{t_k} WOB\,ROP\,dt}{\Delta s_k} \tag{15}$$

$$\langle TQ \rangle_k = \frac{\int_{t_k-\Delta t_k}^{t_k} TQ\,RPM\,dt}{\int_{t_k-\Delta t_k}^{t_k} RPM\,dt} \tag{16}$$

$$\widehat{RPM}_k = \frac{\int_{t_k-\Delta t_k}^{t_k} RPM\,dt}{\Delta t_k} \tag{17}$$

$$\widehat{ROP}_k = \frac{\Delta s_k}{\Delta t_k} \tag{18}$$

$$\langle DOC \rangle_k = \frac{\widehat{ROP}_k}{5\widehat{RPM}_k} \tag{19}$$

The quantity $\overline{MSE}_k$ (i.e., the depth-based MSE evaluated at time $t_k$) may be interpreted as the total energy expended to drill from measured depth $s_k-\Delta s_k$ to measured depth $s_k$, divided by the total volume of subterranean formation removed for the given depth sub-interval $I_k$. For hard formations, it is possible for the instantaneous ROP to be nearly zero, resulting in an instantaneous MSE which tends to infinity. The depth-based MSE (i.e., $\overline{MSE}_k$) on the other hand is a bounded quantity, provided that the prescribed depth increment $\Delta s_k$ is taken to be non-zero.

The parameters $\overline{WOB}_k$, $\langle TQ \rangle_k$, $\widehat{RPM}_k$, $\widehat{ROP}_k$, and $\langle DOC \rangle_k$ appearing in the formula for $\overline{MSE}_k$ may be viewed as weighted time-averaged counterparts of the instantaneous variables WOB, TQ, RPM, ROP, and DOC. The current techniques produce time-averaging schemes which are not simple time-averaging schemes, but rather, are weighted time-averaging schemes (corresponding to depth sub-intervals) which arise naturally when adopting the energy-conserving method to evaluate $\overline{MSE}_k$.

The current techniques are not limited to an energy-conserving method to produce depth-based average quantities in the equations shown above, but may also be applied to other specific forms of MSE. For example the energy-conserving method may be used to evaluate average quantities arising from MSE formulas that are specific to mud motors or MSE equations which take into account hydraulic energy, down hole data, or both.

At block 406, a filter is designed for evaluating a depth-based MSE. The energy-conserving method is used to design a filter for evaluating a real-time depth-based MSE signal during the course of drilling a depth interval of subterranean formation that is based on the received drilling data and at least one prescribed depth increment. For any instance in time, the filter uses the energy-conserving method to produce a depth-based MSE which constitutes a measure of the actual energy used to drill a depth sub-interval (defined by the bit depth and prescribed depth increment), divided by the volume of rock drilled for the depth sub-interval. The filter is designed such that the depth-based MSE may be evaluated as a function of time over the course of drilling the depth interval of subterranean formation.

In one embodiment, a filter is constructed to evaluate $\overline{MSE}_k$ to produce a depth-based MSE signal in time using the energy-conserving method described previously. In this filter, at any instance in time, the depth increment is taken to be uniform, e.g., $\Delta s_k = \Delta s$ where $\Delta s = 1.5$ ft is the prescribed depth increment, for each k meeting the simple condition that $s_k - s_1 \geq \Delta s$ where $k > 1$. By taking $\Delta s_k$ to be constant, the elapsed time or time increment $\Delta t_k$ associated with each depth sub-interval will not generally be the same for each k. Such an approach is beneficial as it results in a procedure for evaluating a depth-based MSE that is less susceptible to large fluctuations induced by variations in the inferred instantaneous or near-instantaneous ROP of the drilling assembly. Furthermore, precision errors associated with estimating the bit depth do not create substantial difficulties in evaluating $\overline{MSE}_k$ when the ROP is very small or is substantially varying in time.

In an embodiment, a real-time system may be run which receives real-time drilling data during the course of a drilling operation. In this embodiment, the system determines at each time $t_k$ an optimal depth increment $\Delta s_k$ to use in evaluating a depth-based MSE. Thus, a suitable balance may be identified in the signal-to-noise ratio of the computed depth-based MSE.

The method is not limited to using an energy-conserving method to design filters for the overall depth-based MSE evaluation. One result of this method is that filters are also provided for evaluating all other quantities appearing in an MSE formula. For example, in the event that the specific embodiment described previously in the context of the energy-conserving method for evaluating $\overline{MSE}_k$ is adopted, the quantities $\langle TQ \rangle_k$, $\widehat{RPM}$, $\widehat{ROP}$, and $(DOC)_k$ may be evaluated using the data collected during the course of drilling the depth sub-interval $I_k$ (where $\Delta s_k$ may or may not be taken as uniform for each k). These expressions represent depth-based averages of the instantaneous quantities TQ, RPM, ROP, and DOC.

To evaluate $\overline{WOB}_k$, a simple function for the inferred bit depth s may be defined using a filtered form of the block height. Components of the bit depth filter may include a torque and drag based model for correlating the change in block height with the change in down hole bit depth, a filter specifically tuned to remove vertical rig displacements induced by wave motions (for offshore drilling environments), or algorithms to produce a smooth expression for the bit depth as a function of time. Such algorithms might include system state estimators, linear quadratic Gaussian observers, Kalman filters, etc., that are used in the industry to evaluate dynamic systems in the presence of noise.

Once such a function for the inferred bit depth has been generated, an ROP may be deduced via temporal differentiation after which the variable $\overline{WOB}_k$ may be evaluated. The consistency requirement shown in Eqn. 20 may also be imposed on the filtered expression for ROP for depth sub-interval $I_k$.

$$\Delta\Delta s_k = \int_{t_k-\Delta t_k}^{t_k} ROP\,dt \tag{20}$$

In practice, the temporally integrated formulas for depth-based MSE and the other variables appearing in the depth-based MSE formula can be approximated using the discrete measurements collected during a drilling operation by adopting a numerical integration formula, such as the trapezoidal rule, Simpson's rule, Riemann sums, the midpoint rule, and the like.

As an example, during a field operation, there are $N_k$ data measurements taken over the course of the time increment $\Delta t_k$ for each prescribed depth increment $\Delta s_k$. The data measurements are taken at the discrete times $t_k^i$, where $i=1, \ldots, N_k$. As a result, the time sub-interval $T_k = [t_k - \Delta t_k, t_k]$ may be expressed as shown in Eqn. 21.

$$[t_k - \Delta t_k, t_k] = \cup_{k=1}^{N_k-1} [t_k^i, t_k^{i+1}] \tag{21}$$

In Eqn. 21, $t_k^i < t_k^{i+1}$ for each i, $t_k^1 = t_k - \Delta t_k$, and $t_k^{N_k} = t_k$. At each time $t_k^i$, a discrete measurement is taken for WOB, TQ, RPM, and inferred bit depth s. Furthermore, a filtered discrete ROP is deduced from the received data at each time $t_k^i$. The discrete quantities, measured and deduced, are referred to as $WOB_k^i$, $TQ_k^i$, $RPM_k^i$, $s_k^i$, and $ROP_k^i$ respectively. It may be assumed that the energy-conserving method for producing the depth-based MSE described with respect to Eqns. 1-19 is used to evaluate $\overline{MSE}_k$. Furthermore, a left Riemann sum is used for the numerical integration which produces the expressions shown in Eqns. 22-26.

$$\overline{WOB}_k \cong \frac{\sum_{i=1}^{N_k-1} WOB_k^i ROP_k^i (t_k^{i+1} - t_k^i)}{\Delta s_k} \quad (22)$$

$$\langle TQ \rangle_k \cong \frac{\sum_{i=1}^{N_k-1} TQ_k^i RPM_k^i (t_k^{i+1} - t_k^i)}{\sum_{i=1}^{N_k-1} RPM_k^i (t_k^{i+1} - t_k^i)} \quad (23)$$

$$\overline{RPM}_k \cong \frac{\sum_{i=1}^{N_k-1} RPM_k^i (t_k^{i+1} - t_k^i)}{\Delta t_k} \quad (24)$$

$$\overline{ROP}_k \cong \frac{\Delta s_k}{\Delta t_k} \quad (25)$$

$$\langle DOC \rangle_k \cong \frac{\overline{ROP}_k}{5\overline{RPM}_k} \quad (26)$$

Finally, $\overline{MSE}_k$ may be evaluated using the formula shown in Eqn. 27.

$$\overline{MSE}_k \cong \frac{1}{A}\left(\overline{WOB}_k + 120\pi \frac{\langle TQ \rangle_k \times \overline{RPM}_k}{\overline{ROP}_k}\right) \quad (27)$$

Substituting the definitions in Eqns. 22-26 into Eqn. 27 results in the formula shown in Eqn. 28.

$$\overline{MSE}_k \cong \quad (28)$$

$$\frac{1}{A}\left[\frac{\sum_{i=1}^{N_k-1} WOB_k^i ROP_k^i (t_k^{i+1} - t_k^i)}{\Delta s_k} + 120\pi \frac{\sum_{i=1}^{N_k-1} TQ_k^i RPM_k^i (t_k^{i+1} - t_k^i)}{\Delta s_k}\right]$$

Further, if the assumption that $ROP_k^i \cong (s_k^{i+1} - s_k^i)/(t_k^{i+1} - t_k^i)$ is adopted, the above expression may be simplified as shown in Eqn. 29.

$$\overline{MSE}_k \cong \frac{1}{A}\left[\frac{\sum_{i=1}^{N_k-1} WOB_k^i (s_k^{i+1} - s_k^i)}{\Delta s_k} + 120\pi \frac{\sum_{i=1}^{N_k-1} TQ_k^i RPM_k^i (t_k^{i+1} - t_k^i)}{\Delta s_k}\right] \quad (29)$$

Note that in this expression for $\overline{MSE}_k$, $WOB_k^i$, $TQ_k^i$, and $RPM_k^i$ are all parameters that may be measured instantaneously, and there is no rate or derivative term in this expression. This method is thus inherently numerically stable.

At block 408, a subterranean drilling operation is conducted, for example, for producing hydrocarbons. The method is not limited to drilling wells for hydrocarbon production, but may be used for any number of other purposes, such as the construction of wells for other purposes. For example, the techniques may be used for controlling drilling operations.

At block 410, parameters are received that characterize the drilling operations. These parameters may be as discussed with respect to FIG. 3 and Eqns. 1-29. At block 412, the received data is used to evaluate a depth-based MSE signal using the developed filters while drilling a depth interval of subterranean formation. The depth increments used by the filters may be prescribed prior to drilling, prescribed and/or modified while drilling, or determined by modeling of the drilling process. The prescription of the depth increment may be made to balance the amount of noise in the measurements of the received data against a loss in variation in the depth-based MSE signal (where the latter may be induced by substantially increasing the value of the prescribed depth increment). This is discussed further with respect to the example. The evaluation may be performed using the equations discussed above, e.g., Eqn. 29. At block 414, a limiter is identified from the depth-based MSE values, such as a bit balling event, a slip-stick event, a buckling of a drill string, whirling of the bottom hole assembly, or a change in rock types, among others. In some instances, the limiter may be recognized simply as an increase of MSE at certain operating parameters, relative to the MSE values at alternative operating parameters. At block 416, the drilling parameters are adjusted to mitigate the limiter, for example, adjusting the WOB to adjust the ROP for harder or softer rock layers.

It can be understood that the depth-based MSE may be used to control the drilling operation even in the absence of identified limiters. For example, adjusting the drilling parameters while evaluating a depth-based MSE may allow for the presence of at least one limiter to be inferred for some combinations of input drilling parameters. Input drilling parameters may therefore be adjusted in response to the evaluated depth-based MSE to avoid or mitigate such limiters in the event that such limiters can only be inferred and not identified.

The energy-conserving method described for designing filters for evaluating the depth-based MSE signal and the other depth-based drilling parameter signals may be adopted for use by a drilling advisory system. In particular, the drilling advisory system may be used to receive data characterizing the drilling process and to execute algorithms in real-time to produce a depth-based MSE signal (and depth-based signals for other drilling parameters) while drilling. The drilling advisory system may further use the received drilling data along with the produced depth-based signals to identify suitable depth sub-intervals to be used by a set of drilling performance optimization algorithms.

Figure 5:
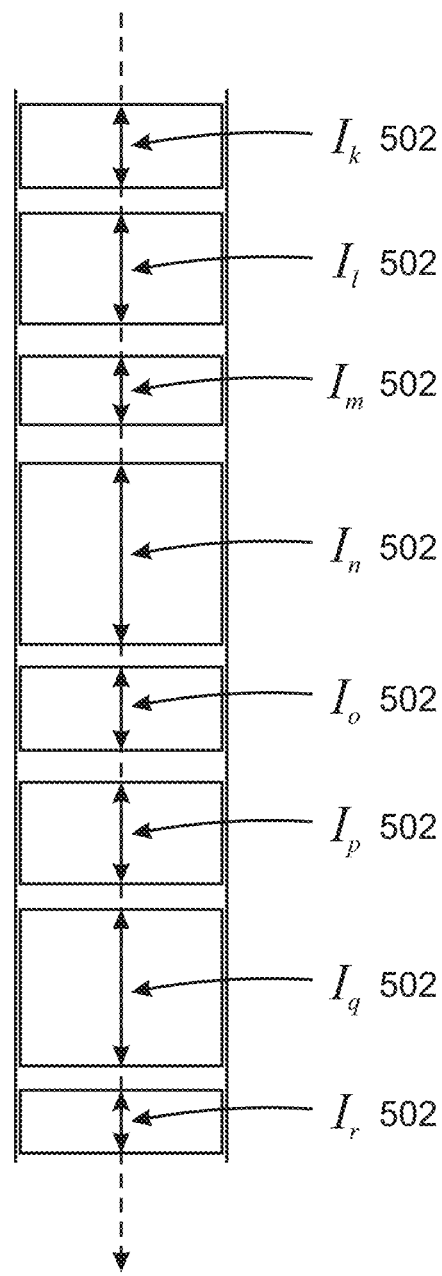
FIG. 5 is a drawing of a depth interval that has been drilled, along with a set of identified depth sub-intervals ($I_k$, $I_l$, $I_m$, $I_n$, $I_o$, $I_p$, $I_q$, and $I_r$)

FIG. 5 is a drawing of a depth interval 500 that has been drilled, along with a set of identified depth sub-intervals 502 ($I_k$, $I_l$, $I_m$, $I_n$, $I_o$, $I_p$, $I_q$, and $I_r$). The depth sub-intervals 502 identified by a drilling advisory system, such as described with respect to FIG. 3, may, in general, be overlapping or non-overlapping (for the case shown in FIG. 3, the depth sub-intervals are all non-overlapping). The drilling performance optimization algorithms may use the averaged parameters produced by the energy-conserving method for each identified depth sub-interval 502 for the purpose of producing recommendations to field personnel to optimize drilling performance while drilling. As one example, the drilling advisory system may recommend the use of controllable drilling parameters (for example, WOB, RPM, and/or flow rate) that were used to drill one of the identified depth sub-intervals 502, and which resulted in acceptable drilling performance. In this example, the depth-based MSE value for each identified depth sub-interval 502 would be used to determine the recommended controllable drilling parameters. In another example, the drilling advisory system may identify trends based on values of the depth-based data produced by the energy-conserving method for each identified depth sub-interval 502. Identified trends would then be used to produce recommendations for controllable drilling parameters.

EXAMPLE

The techniques described herein were tested using field data previously recorded at the surface for the drilling of an 8.5-inch intermediate hole section. All surface channels were sampled at a frequency of 1 Hz. The depth-based MSE was calculated using the method 400 described with respect to FIG. 4.

Figure 6A:
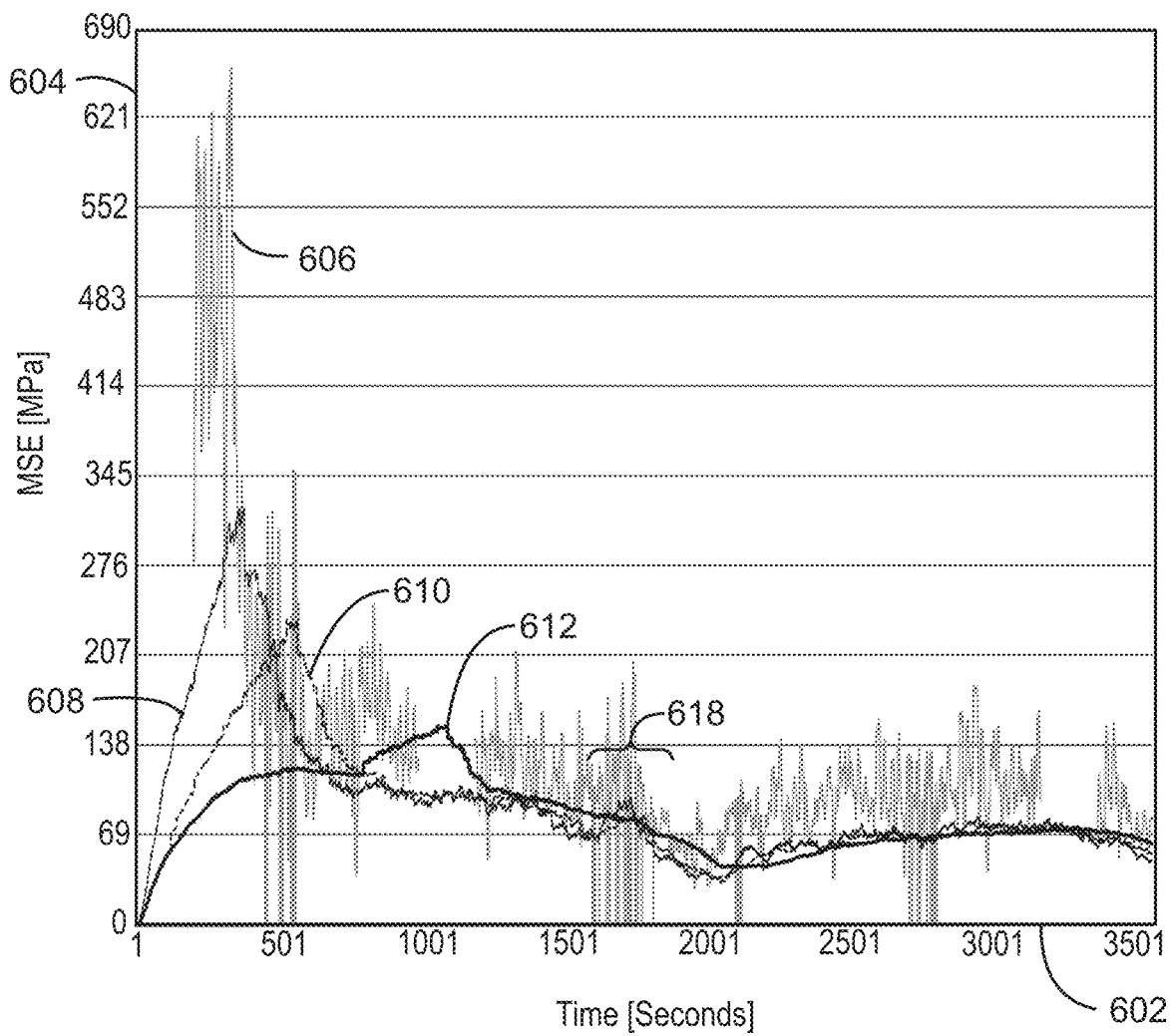
FIGS. 6A and 6B are plots of MSE over time during a drilling operation, showing the results of depth based averaging.
Figure 6B:
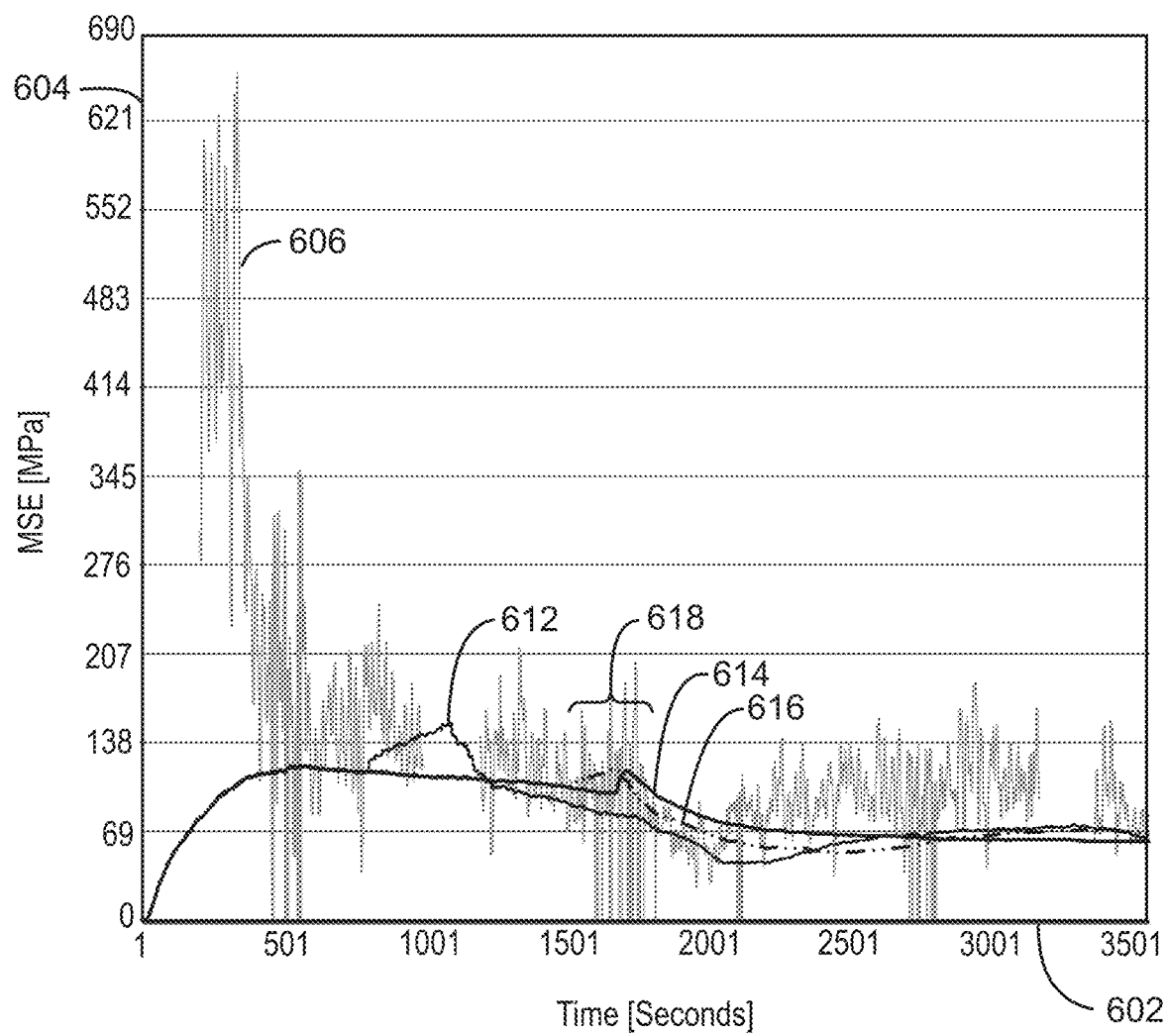

FIGS. 6A and 6B are plots 600A and 600B of MSE versus time during a drilling operation, showing the results of depth-based averaging for various depth increment values. In each figure, the x-axis 602 represents the drilling time in seconds, while the y-axis 604 represents the MSE in MPa. The figures show an MSE signal as calculated using time-based filtering 506, as well as MSE signals evaluated using the energy-conserving depth-based procedure for various depth increments, e.g., 0.5 ft 608, 1 ft 610, 2.5 ft. 612, 5 ft. 614, and 20 ft. 616. Each of the depth-based MSE traces has been evaluated using the methods disclosed in the invention. The plot 600 may show that, as the depth increment is increased, the amount of noise is decreased, which may increase the usefulness of the MSE values. However, the plot 600 may also show that important information may be lost if the depth increment is increased too far. For example, features seen at region 618 in the traces obtained using shorter depth increments 608-614 get smaller as the depth increment is increased and are almost eliminated in the 20 ft. depth increment 616 trace. The selection of the depth increment to balance the information of the depth-based MSE trace with the noise reduction may depend on the depth of rock layers, the types of rock layers, and the overall depth of the wellbore, among others.

Figure 7A:
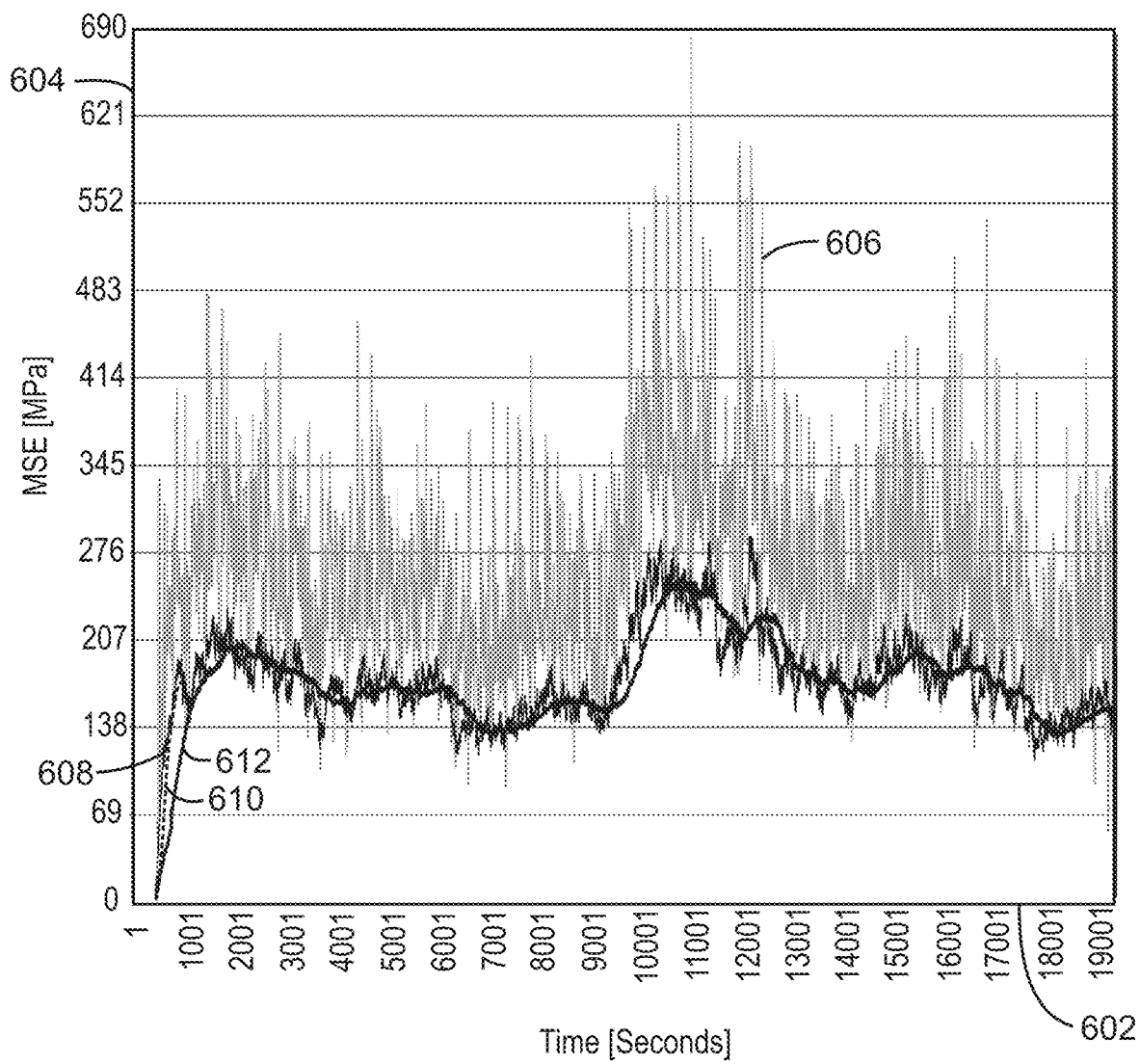
FIGS. 7A and 7B are plots of MSE over time during a drilling operation, showing the results of depth based averaging over a longer period of time.
Figure 7B:
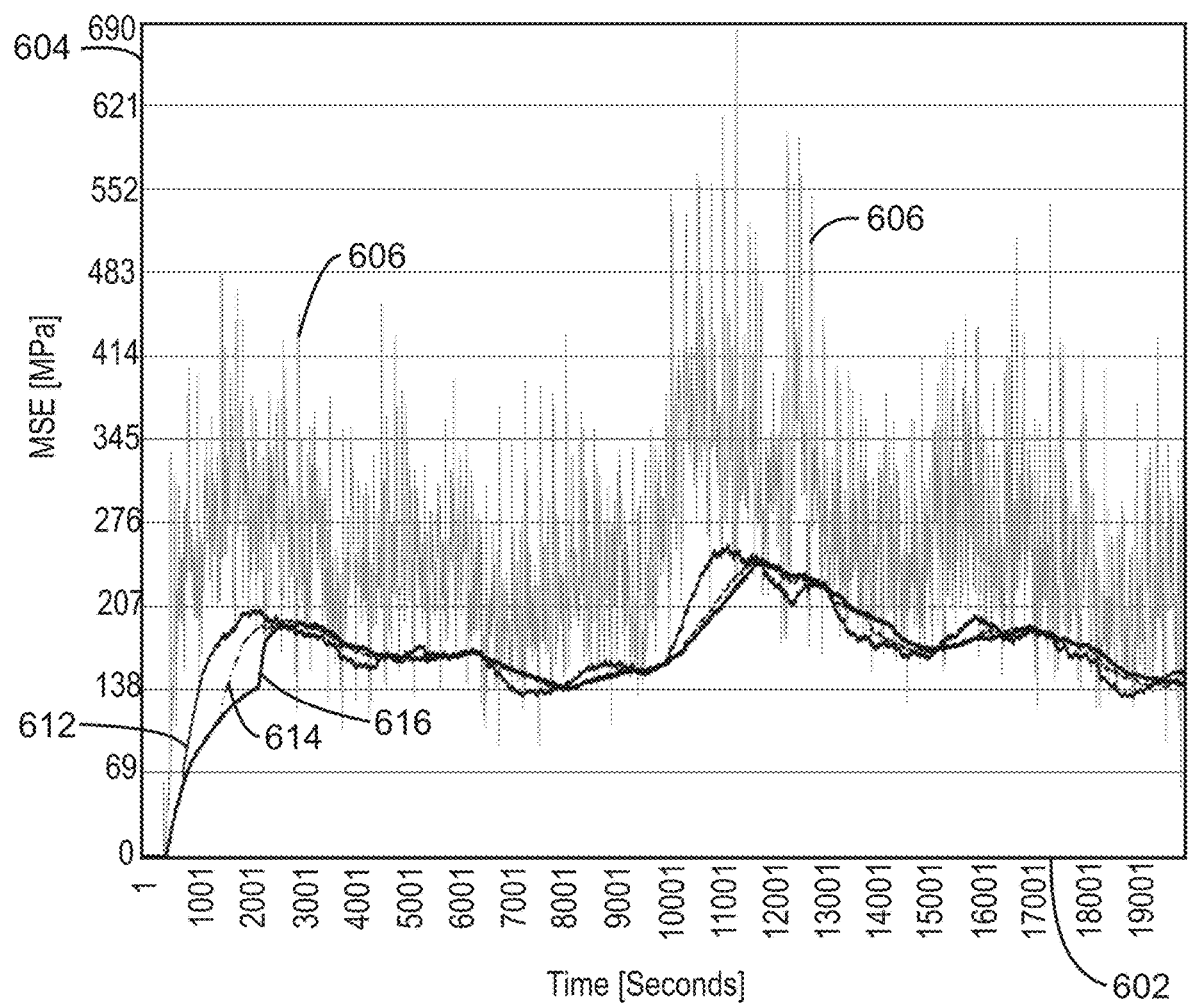

FIGS. 7A and 7B are plots 700A and 700B of MSE over time during a drilling operation, showing the results of depth based averaging over a longer period of time, e.g., for a much deeper well bore. Like numbered items are as discussed with respect to FIGS. 6A and 6B. As for the plots 600A and 600B of FIGS. 6A and 6B, the MSE signals in the plots 700A and 700B in FIGS. 7A and 7B have been evaluated using a time-based calculation procedure along with various depth-based MSE signal implementations. In these plots 700A and 700B, a longer depth increment, 20 ft. 616, may be more useful, as the relationship to the length of the wellbore and certain features, e.g., shown in region 702, may provide the best control of the drilling operations. However, depending on the importance of other features, e.g., shown in region 704, a longer depth increment may not show important information.

It should be understood that the preceding is merely a detailed description of specific embodiments of this invention and that numerous changes, modifications, and alternatives to the disclosed embodiments can be made in accordance with the disclosure here without departing from the scope of the invention. Rather, the scope of the invention is to be determined only by the appended claims and their equivalents.

What is claimed is:

1. A method of drilling a wellbore, comprising:
receiving drilling parameters characterizing a drilling operation in a subterranean formation in a data receiving system;
identifying a depth interval of the wellbore that has been drilled by a drilling assembly;
subdividing the drilled depth interval into a series of depth sub-intervals and identifying the time required to drill each depth sub-interval;
calculating for each depth sub-interval in the series, using data received by the data receiving system and the identified time require to drill each depth sub-interval, a set of weighted time averages of each of the received drilling parameters over each of the depth sub-intervals, wherein calculating the set of calculated weighted time averages for each depth sub-interval includes calculating an RPM-weighted time average determined by the relationship $$\langle TQ \rangle_k = \frac{\int_{t_k - \Delta t_k}^{t_k} TQ\, RPM\, dt}{\int_{t_k - \Delta t_k}^{t_k} RPM\, dt};$$

calculating a depth-based Mechanical Specific Energy (MSE) value for each depth sub-interval using the set of calculated RPM-weighted time averages;
controlling the drilling operation based, at least in part, on the calculated depth-based MSE; and
drilling the wellbore during the drilling operation.

2. The method of claim 1, comprising identifying the depth sub-interval in terms of an at least one measured bit depth and an at least one prescribed depth increment.

3. The method of claim 2, comprising:
calculating a plurality of depth-based MSE values at a measured bit depth during the drilling operation, each using a different depth interval;
repeating the calculation at additional measured bit depths; and
prescribing the depth increment for at least one bit depth from the plurality of calculated depth-based MSE values.

4. The method of claim 2, comprising calculating the depth-based MSE over at least one prescribed depth increment based on the received drilling parameters.

5. The method of claim 2, comprising:
calculating a plurality of depth-based MSE values at a measured bit depth during the drilling operation, each using a different depth increment; and
prescribing the depth increment from the plurality of calculated MSE values.

6. The method of claim 1, comprising determining one of a plurality of limiters that limit the rate of penetration (ROP) from the calculated depth-based MSE.

7. The method of claim 6, comprising:
adjusting the drilling operations to mitigate the one of a plurality of limiters; and
iterating the calculation of the depth-based MSE.

8. The method of claim 1, comprising determining an equation for calculating the depth-based MSE using an energy-conserving method configured to average a mechanical specific energy equation over the identified depth increment.

9. The method of claim 1, wherein each of the depth sub-intervals in the series are not necessarily of uniform depth increment.

10. The method of claim 1, wherein a limiter comprises a stick-slip event, a bit dulling event, a bit wearing event, or any combinations thereof.

11. The method of claim 1, wherein a limiter comprises a rise in the value of the depth-based MSE for some at least one depth sub-interval as compared to the value of the depth-based MSE for at least one of some other depth sub-interval.

12. The method of claim 1, wherein the drilling parameters comprise a surface torque (TQs), a down hole bit torque (TQb), a surface weight on bit (WOBs), a down hole weight on bit (WOBb), a drillstring rotation rate (RPM), a rate of penetration (ROP), a time, a hole depth, a bit depth, or a depth of cut (DOC), a down hole RPM, or any combinations thereof.

13. The method of claim 1, comprising using an energy-conserving method to calculate depth-based values for the depth increment for a depth of cut (DOC); a rate of penetration (ROP); a weight-on-bit (WOB); a torque (TQ); a drillstring rotation rate (RPM); or any combinations thereof.

14. The method of claim 13, comprising designing a bit depth filter to calculate the depth-based WOB.

15. The method of claim 14, comprising using a torque and drag model to design the bit depth filter.

16. The method of claim 1, comprising using at least one numerical integration formula.

17. The method of claim 16, comprising implementing the trapezoidal rule, Simpson's rule, Riemann sums, or the midpoint rule for use in the at least one numerical integration formula.

18. A system for drilling a wellbore in a subterranean formation, comprising:
 a drilling rig;
 a control system coupled to the drilling rig, wherein the control system comprises a processor;
 a plurality of sensors disposed on the drilling rig; and
 a non-transitory computer readable storage medium comprising computer readable instructions configured to direct the processor to:
  obtain a plurality of drilling parameters from the plurality of sensors to characterize a drilling operation;
  use the received drilling parameters to calculate a depth-based mechanical specific energy (MSE), the calculating comprising;
   identifying a depth interval of the wellbore that has been drilled by a drilling assembly;
   subdividing the drilled depth interval into a series of depth sub-intervals and identifying the time required to drill each depth sub-interval;
   calculating for each depth sub-interval in the series, using data received by the data receiving system and the identified time require to drill each depth sub-interval, a set of weighted time averages of each of the received drilling parameters over each of the depth sub-intervals, wherein calculating the set of calculated weighted time averages for each depth sub interval includes calculating
   an RPM-weighted time average determined by the relationship $$\langle TQ \rangle_k = \frac{\int_{t_k - \Delta t_k}^{t_k} TQ\, RPM\, dt}{\int_{t_k - \Delta t_k}^{t_k} RPM\, dt};$$

calculating a depth-based Mechanical Specific Energy (MSE) value for each depth sub-interval using the set of calculated RPM-weighted time averages; and
  drill the wellbore using the drilling rig and the control system, based at least in part upon the calculated depth-based MSE.

19. The system of claim 18, comprising computer readable instructions configured to direct the processor to determine one of a plurality of limiters that limit a rate of penetration.

20. The system of claim 18, wherein a sensor comprises a torque sensor, a sensor configured to measure a weight of a drillstring, a sensor to determine the rotation rate of the drillstring, a mud flow rate sensor, a differential pressure sensor, or a sensor configured to determine the length of the drillstring, or any combinations thereof.

21. The system of claim 18, comprising output devices configured to provide personnel with drilling advice.

22. The system of claim 21, wherein the output devices comprise a display, an audible tone generator, an electronic mail interface, or a phone interface, or any combinations thereof.

23. The system of claim 18, comprising a mud motor.

24. A non-transitory machine readable data storage medium comprising instructions configured to direct a processor to:
 receive data regarding a plurality of drilling parameters characterizing a drilling operation in a control system;
 use the received drilling parameters to calculate a depth-based mechanical specific energy (MSE), the calculating comprising;
  identifying a depth interval of the wellbore that has been drilled by a drilling assembly;
  subdividing the drilled depth interval into a series of depth sub-intervals and identifying the time required to drill each depth sub-interval;
  calculating for each depth sub-interval in the series, using data received by the data receiving system and the identified time require to drill each depth sub-interval, a set of weighted time averages of each of the received drilling parameters over each of the depth sub-intervals, wherein calculating the set of calculated weighted time averages for each depth sub interval includes calculating
  an RPM-weighted time average determined by the relationship $$\langle TQ \rangle_k = \frac{\int_{t_k - \Delta t_k}^{t_k} TQ\, RPM\, dt}{\int_{t_k - \Delta t_k}^{t_k} RPM\, dt};$$

calculating a depth-based Mechanical Specific Energy (MSE) value for each depth sub-interval using the set of calculated RPM-weighted time averages;
  providing the depth-based MSE to the drilling control system for use in a drilling operation.

25. The non-transitory machine readable medium of claim 24, comprising code configured to direct the processor to:
iterate the calculation of the MSE for the depth sub-interval during the drilling operation; and
recommend adjustments to the drilling parameters.

26. The non-transitory machine readable medium of claim 24, comprising code configured to direct the processor to:
identify limiters that slow a rate of penetration of a drill bit; and
recommend adjustments to the drilling parameters to mitigate the limiters.

27. The non-transitory machine readable medium of claim 24, comprising code configured to direct the processor to:
calculate the depth-based MSE over a plurality of depth sub-intervals for a bit depth; and
select the depth increment used to control the drilling operation.

28. The non-transitory machine readable medium of claim 24, comprising code configured to direct the processor to:
monitor the signal-to-noise level of the depth-based MSE for a plurality of depth increments as a bit depth; and
select the depth increment that matches a previously selected signal-to-noise ratio for the depth-based MSE.

* * * * *